(12) United States Patent
Unterschuetz

(10) Patent No.: US 9,979,729 B2
(45) Date of Patent: May 22, 2018

(54) CONTROLLING ACCESS FOR A HOME CONTROL DEVICE INCLUDING AN ONLINE MODE AND AN OFFLINE MODE

(71) Applicant: DEUTSCHE TELEKOM AG, Bonn (DE)

(72) Inventor: Thomas Unterschuetz, Weiterstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 38 days.

(21) Appl. No.: 14/897,650

(22) PCT Filed: Jun. 11, 2014

(86) PCT No.: PCT/EP2014/062147
§ 371 (c)(1),
(2) Date: Dec. 11, 2015

(87) PCT Pub. No.: WO2014/198782
PCT Pub. Date: Dec. 18, 2014

(65) Prior Publication Data
US 2016/0127372 A1 May 5, 2016

(30) Foreign Application Priority Data

Jun. 12, 2013 (DE) .......................... 10 2013 106 119

(51) Int. Cl.
*G06F 21/00* (2013.01)
*H04L 29/06* (2006.01)
(Continued)

(52) U.S. Cl.
CPC .......... *H04L 63/10* (2013.01); *H04L 12/2818* (2013.01); *H04L 12/2836* (2013.01);
(Continued)

(58) Field of Classification Search
CPC .......... H04L 63/10; H04L 63/08; H04L 67/12
(Continued)

(56) References Cited

U.S. PATENT DOCUMENTS

| 7,716,489 B1 | 5/2010 | Brandt et al. |
| 2005/0010756 A1* | 1/2005 | Clerc ...................... G06F 21/33 713/155 |

(Continued)

FOREIGN PATENT DOCUMENTS

| DE | 102005021854 B4 | 11/2006 |
| DE | 102011117186 A1 | 5/2013 |

(Continued)

*Primary Examiner* — Haresh N Patel
(74) *Attorney, Agent, or Firm* — Leydig, Voit & Mayer, Ltd.

(57) ABSTRACT

A method for controlling access to a system for supporting home control activities includes hierarchical authorization of the user. Access in an online mode, in which there is a connection between a central platform and a home control device, is granted by the central platform, in particular user rights are derived, and the user only has the right of access to the home control device if the right of access to the central platform is in place. In an offline mode, rights stored locally on the home control device control access. Access to the applications is granted by the home control device, in particular application-specific user rights are derived, and a user only has the right of access to the applications if the right of access to both the home control device and also to the central platform is in place.

8 Claims, 3 Drawing Sheets

(51) Int. Cl.
*H04W 12/08* (2009.01)
*H04L 29/08* (2006.01)
*H04L 12/28* (2006.01)

(52) U.S. Cl.
CPC ............ *H04L 63/08* (2013.01); *H04L 63/105* (2013.01); *H04L 67/12* (2013.01); *H04W 12/08* (2013.01)

(58) Field of Classification Search
USPC .......................................................... 726/4
See application file for complete search history.

(56) References Cited

U.S. PATENT DOCUMENTS

| | | | |
|---|---|---|---|
| 2006/0259955 | A1 | 11/2006 | Gunther et al. |
| 2007/0254630 | A1* | 11/2007 | Moloney ................. H04L 63/06 455/410 |
| 2008/0282182 | A1* | 11/2008 | Oosaka ............... H04L 12/2803 715/772 |
| 2009/0156209 | A1* | 6/2009 | Franklin ............. H04L 12/5692 455/435.2 |
| 2010/0122091 | A1 | 5/2010 | Huang et al. |
| 2010/0138900 | A1* | 6/2010 | Peterka ............... H04L 12/2812 726/4 |
| 2011/0124315 | A1* | 5/2011 | LaFreniere ........... H04M 3/382 455/410 |
| 2012/0324545 | A1* | 12/2012 | Hamid ................ H04L 63/0853 726/4 |
| 2013/0083805 | A1* | 4/2013 | Lu ....................... H04L 12/2807 370/401 |
| 2013/0179500 | A1* | 7/2013 | Kacin ................. H04L 12/2809 709/204 |
| 2013/0268129 | A1* | 10/2013 | Fadell .................... G06Q 10/20 700/278 |
| 2014/0230018 | A1* | 8/2014 | Anantharaman ... H04L 63/0861 726/4 |
| 2014/0359692 | A1* | 12/2014 | Chari ..................... H04L 63/20 726/1 |
| 2015/0146567 | A1* | 5/2015 | Ylimartimo ........ H04L 63/0272 370/254 |

FOREIGN PATENT DOCUMENTS

| | | |
|---|---|---|
| EP | 1833222 A1 | 9/2007 |
| EP | 1965595 B1 | 10/2009 |
| GB | 2479916 A | 11/2011 |

\* cited by examiner

CONTROLLING ACCESS FOR A HOME CONTROL DEVICE INCLUDING AN ONLINE MODE AND AN OFFLINE MODE

CROSS-REFERENCE TO RELATED APPLICATIONS

This application is a U.S. National Phase application under 35 U.S.C. § 371 of International Application No. PCT/EP2014/062147, filed on Jun. 11, 2014, and claims benefit to German Patent Application No. DE 10 2013 106 119.2, filed on Jun. 12, 2013. The International Application was published in German on Dec. 18, 2014 as WO 2014/198782 A1 under PCT Article 21(2).

FIELD

The invention relates to a system S for supporting home control activities. The user should be able, for example, to switch lights on and off, operate an alarm system or a washing machine in his apartment by using S. Other applications are also conceivable.

FIG. 1 provides an overview of the elements of S mentioned and described in the following within the context of the example referred to above.

For the provision of home control activities, S has a central device, the home control device in the household of the user. Appliances, such as sensors or actuators, can be connected to the home control device by means of S. The appliance is generally hardware in the household of the user (e.g. light switches, motion detectors, etc.) whereas the application is generally to be regarded as software. Of course, there may also be overlaps. In the present example, there is in particular a heating valve controllable by S, a thermometer readable by S and a boiler controllable via S.

Appliances such as sensors, actuators, e.g. motion detectors, window closers, etc., communicate via the home control network with applications on the home control device. In the present example, temperature data are communicated to the heating control application.

The home control device can operate a large number of applications at the same time. They are used for home control, e.g. for lighting control, controlling the alarm system, an air conditioning system or, as in our example, for heating control.

The application for heating control then causes opening or closing of the heating valves and, if necessary, causes a mode change of the boiler. This takes place in the present example according to a temperature control process specifically offered by the application. In addition to this fully automated operation, the heating control application offers the user the opportunity to adjust the temperature in individual rooms manually at any time.

BACKGROUND

DE 10 2005 021 854 B4 discloses a method for the optimised assignment of access rights to IT resources managed by means of a security management system in which
 a security domain is defined in accordance with at least one property of IT resources,
 a plurality of authorisation profiles are provided for the security domain,
 user groups are assigned to the security domain,
 the user groups assigned to the security domain are linked to authorisation profiles provided for said security domain,
 IT resources are assigned to the security domain in accordance with the property of the IT resources defining said security domain, and
 user groups assigned to the security domain are given access rights to the IT resources assigned to said security domain in accordance with the authorisation profiles linked to thereto.

The publication, however, does not provide any instructions for hierarchical authentication and authorisation between a central platform and a locally operable unit, such as a customer device in an inhomogeneous device architecture.

SUMMARY

In an embodiment, the invention provides a method for controlling access to a system for supporting home control activities, comprising a central platform which is accessed by a user via the Internet; a home control device which is disposed in the household of the user and which is connected to the central platform via the Internet and which is connected to appliances in the household of the user; applications which run on the home control device in order to control, regulate and/or program the appliances. The method comprises hierarchical authorization of the user, wherein access in an online mode, in which there is a connection between the central platform and the home control device, is granted by the central platform, in particular user rights are derived, and the user only has the right of access to the home control device if the right of access to the central platform is in place, wherein in an offline mode, in which there is no connection between the central platform and the home control device, rights stored locally on the home control device control access, wherein access to the applications is granted by the home control device, in particular application-specific user rights are derived, and a user only has the right of access to the applications if the right of access to both the home control device and also to the central platform is in place.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
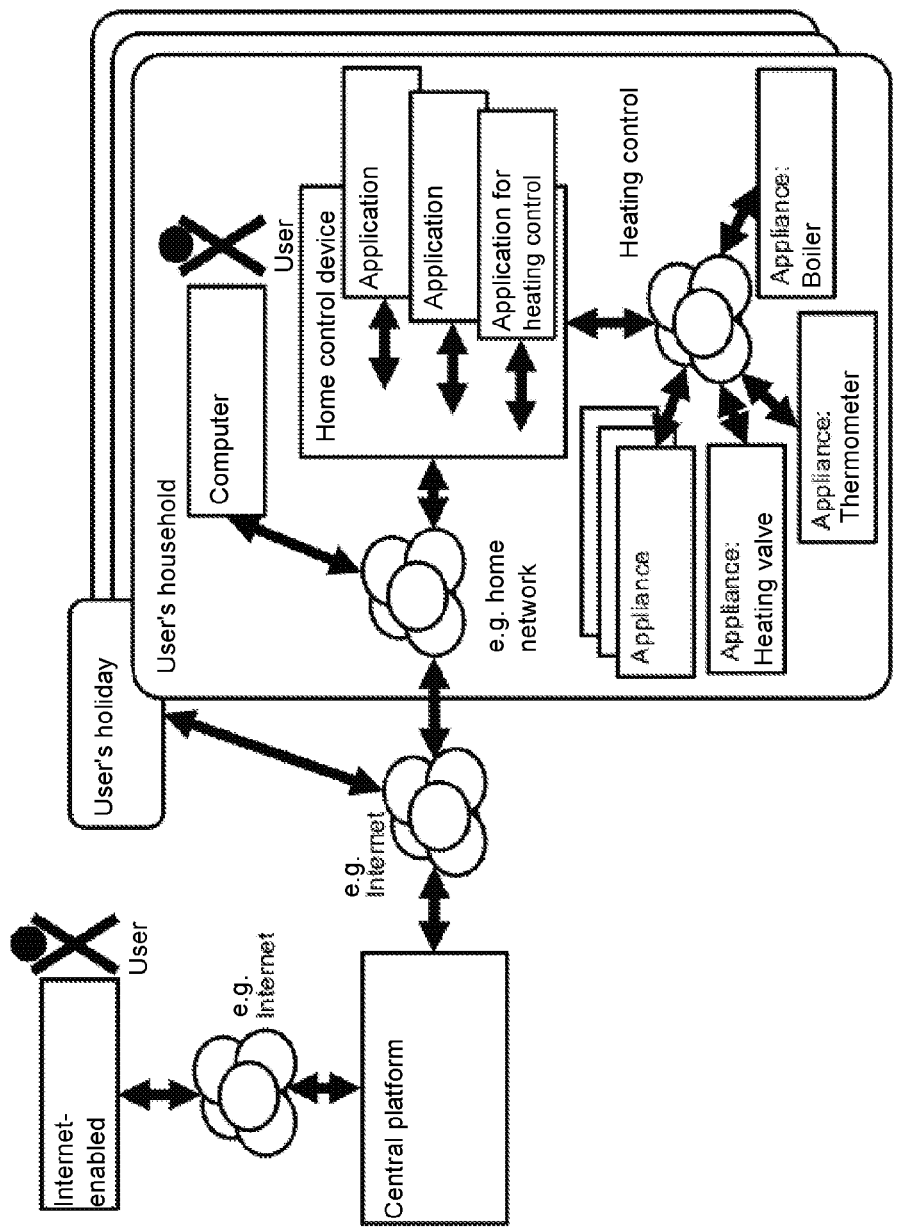
FIG. 1 shows the visualisation of the problem context.

In an embodiment, the invention provides a method for controlling the access to a system for supporting home control activities, comprising a central platform which is accessed by a user via the Internet;
 a home control device which is disposed in the household of the user and which is connected to the central platform via the Internet and which is connected to appliances in the household of the user;

applications which run on the home control device in order to control, regulate and/or program the appliances; characterised by hierarchical authorisation of the user, wherein in the online mode, in which there is a connection between central platform and home control device, access is granted by the central platform and in a possible embodiment the user rights are derived from the central platform and the user only has the right of access to the home control device if the right of access to the central platform is in place, and wherein in the offline mode, in which there is no connection between central platform and the home control device, rights stored locally on the home control device control access, wherein the access is defined by the home control device, and in a possible embodiment the user rights to the applications are derived from the home control device, and a user only has the right of access to the applications if the right of access to both the home control device and also to the central platform is in place.

Control of the access is thus specified from top to bottom, with a central platform on the Internet which is accessible for a user being regarded as the highest hierarchy level.

There are a number of special cases in connection with this offline status.

For example, the user can change his password on the central platform. The home control device, however, is currently offline and will also remain this way for a while. That is to say, the home control device is (still) accessed with the old/outdated password.

Alternatively, for example, the user can change his password on the central platform. The home control device, however, is currently offline. When the home control device next goes online, the password of the user is transferred to the home control device. The home control device then goes offline again. From then on, the user can log onto the home control device with his changed password.

In a further alternative, for example, the user can change his password on the central platform. The home control device, however, is currently offline. When the home control device next goes online, the central platform marks the old/outdated password of the user as invalid on the home control device. Optionally, the method may allow or forbid the user to (still) log on locally on the home control device with his password which is marked as outdated.

In yet another alternative, for example, the user can change his password on the central platform. The home control device, however, is currently offline. When the home control device next goes online, the central platform marks the old/outdated password of the user as invalid on the home control device. On next using the home control device, although he has already been authenticated by the central platform, the user will be asked for the password again by the home control device. The password is challenged by the home control device on the central platform, i.e. checking of the password is initiated. After (positive) verification, the password is stored on the home control device. The home control device then goes offline again. The user can log onto the home control device with his changed password.

In yet another alternative, for example, in the method referred to above the password can be transmitted in plain text or encrypted, e.g. in the method referred to above, a hash value of the password is transmitted in place of the password.

In yet another alternative, for example, as part of the method referred to above, the password or a hash value of the password can be secured against unauthorised access on the home control device by means of software or hardware measures. Measures for this are, for example, the use of a Trusted Platform Module, encryption and/or fragmentation.

As a result of this, access to the home control device can be established in a central location, also via mobile terminals, by accessing the central platform which then in turn regulates access and control of the underlying components. Regardless of whether the central platform is accessed via the Internet or the home control device in a local network, in the preferred embodiment the interface is identical for a mobile user who, for example, uses a mobile terminal such as an iPhone or Android phone on which relevant applications are installed. There may also, however, be deviations. The authorisation of access to individual applications and home control devices is managed, however, by the central platform and is passed down through the hierarchy. For example, if a plurality of home control devices are to be managed by the central platform via one account, then the user rights, for example, can be copied from one home control device to another. Different user rights may also be in place within one account for different home control devices.

In a further embodiment, rights of access to functions of the applications may be given and a user only has the right of access to the functions if the right of access to the application is given. In this case, it should be noted that applications which control a heating system for example, provide a wide range of different functions. For example, the heating curve which is determined by the outdoor temperature can only be modified by a user with certain rights. The temperature setting, on the other hand, can be changed by a large number of other people. The applications are therefore also precisely controllable with regard to their user rights, while these user rights, however, can also be derived from above. Basically, the following options are conceivable. The rights, however, are initially defined locally; they are not (necessarily) derived from the higher level down but access or admission to the level is determined by the overlying level. Alternatively, they could also be passed down from top to bottom.

In a preferred embodiment, the user authorises himself in the online mode on the central platform which determines the rights of the home control device and of the application. The central platform thus manages a large number of user accounts in each of which one or a plurality of home control devices have registered. The registration may take place automatically, for example on the basis of a unique serial number of the home control device. As soon as the home control device logs on to the central platform, it will be queried as to whether a new account is to be set up or whether the home control device is to be included in an existing account. This can be controlled automatically via web interface. Access to the account on the central platform may be gained by means of smartcards, token or password and login data. Of course, other alternatives are conceivable.

Basically, it should be noted that it should also be possible to operate the home control device in the offline mode. The offline mode always exists when there is no Internet connection to the central platform. In such a state, it is possible to access the home control device via a local network within the house which is configured, for example, as a corded LAN or a cordless WLAN. The interface which is provided in this case preferably corresponds to that which is provided by the central platform in the online mode. However, some functions cannot be activated. In addition, rights may be restricted. Usually, the quantity of rights which are provided in the offline mode is a sub-quantity of the rights that are provided in the online mode. Thus it is conceivable that certain data backup measures and recovery measures are not possible in the offline mode. It is also not possible to access statistical information which is provided by the central platform. The installation of programs is likewise restricted. In principle, the rights control can also be controlled functionally so that certain rights are given or not given depending on the offline or online mode. It is understood that functions which can only be carried out when the system is in the online mode cannot be provided in the offline mode with the result that the rights for that can also not be given. It is possible, however, that a configuration going beyond this is conceivable. Thus the locally stored rights rules for the offline mode are always applicable when the home control device is in the offline mode. Thus a differentiated assignment of rights is conceivable for the offline mode. In the offline mode, the user authorises himself on the local home control device, while the user rights are determined locally by the home control device and therefore access to the applications is enabled. In one possible embodiment, the application-specific user rights are also determined on the applications.

It emerges from this in a preferred embodiment that the local user rights on the home control device are derived from the user rights of the central platform and are stored there or deviate from them such that rights other than those in the online mode are applicable in the offline mode.

In a preferred embodiment, access to an application shop can be given via the central platform in order to download applications for the home control device. This application shop may be imagined like an AppStore for mobile terminals in which the user can download free or paid applications for controlling the appliances in the house. So, for example, the manufacturer of an appliance may deposit his applications accordingly in the shop so that they can easily be installed. The shop may be equipped with certified applications that can only run on certified home control devices. Appropriate certifications may be achieved by means of certificates. It should be noted that the applications which are installed on the home control device are managed on the central platform. Their working and configuration parameters are also regularly backed up centrally. This makes it possible on the one hand to achieve fast recovery of the current state of the home control device if this device has failed, or the entire configuration may be transferred to another new home control device. Synchronisation of the data and configuration parameters may take place continuously or in specific time sequences. In addition, it is possible to perform a manual back-up in which a current status of a home control device is backed up centrally. This makes it possible to repeatedly input a certain status to the home control device.

As has already been explained above, it is envisaged in another possible embodiment that the central platform manages a large number of home control devices for one and/or a plurality of users.

In the online mode, the central platform accepts the requests and/or commands to the home control device and forwards them. This makes it possible for mobile terminals to activate the home control device via the Internet without having to construct virtual private networks. The central platform can thus serve as a focal point in the Internet for accepting commands and processing them in that they are forwarded to the home control device. Communication can thus be carried out by standard protocols such as HTTPS or similar SSL approaches which every mobile terminal now supports.

Considered formally, the user has an identity (e.g. user name) at S. With this identity and a single associated credential (e.g. user name and password), the user should be able to access all components belonging to S.

He uses the identity and the credentials
  for access to the central platform via the Internet as well as for access to the home control device via the Internet and via the platform.
  for local access to the home control device via the home network.

Component-specific rights can be defined for all components belonging to S (e.g. central platform, home control device or applications). The rights are different from one component to another. The different rights are tacked to identities by S.

The following examples serve to illustrate the rights of various components: Let A and B be the identities of two users.
  A may sign the general terms and conditions (component: central platform)
  B may use the system via the Internet (central platform)
  A may install and use an application on this home control device (home control device)
  B may use applications on this home control device (home control device)
  A may set the room temperature above the very high value of 23° (heating control application)
  B may select a different temperature scenario (heating control application).

The user should only be permitted to access a home control device if he is both known as a user in the central platform and also if he has rights of use to the home control device.

The user should only be permitted to access applications if he is both known as a user in the home control device and also if he has rights of use to the application.

In the event of a faulty or broken connection (offline mode) between the home control device and the central platform, the user should be able to access and execute all the functions of the home control device. Of course, the offline availability of all functions can only be guaranteed if the central platform does not make any vital contribution to the function under consideration: For example, a backup copy stored on the central platform can only be restored if a connection exists between home control device and central platform.

In addition to the heating application, provided that S for example has a suitable shop, the user may purchase further applications and may have them installed, operated or monitored by means of S on his home control device. The central platform provides or initiates such central functionalities.

In addition to using S from his own household, the user can also access his applications while on the move. For this the central platform provides access over the Internet and forwards requests/queries e.g. from an Internet-enabled computer to the home control device of the user. E.g. the user can increase the temperature in his apartment on a computer (Internet-enabled) shortly before leaving work.

In addition to using a single home control device, a user can also own a plurality of home control devices. E.g. one home control device may be located in the (main) household of the user and another one may be in his holiday apartment. The home control device is usually connected to the central platform, e.g. via the Internet. However, local use of the home control device should also be possible if the home control device has no connection to the central platform. E.g. the user can log on locally to the home control device even if the Internet connection is not available (at that moment) and set room temperatures for example.

The following section describes the proposed patentable method for problem-solving the problem referred to above.

The method is described in each case for individual (classes of) hierarchy levels. In this case, the highest hierarchy level in particular differs from the middle hierarchy levels. The lowest level can be regarded as a special case of a middle level.

In contrast to the known prior art, the approach according to the invention is characterised by the physical and local separation of hierarchy levels. Thus, it may happen in the offline mode that individual hierarchy levels and associated authorisations must occasionally be designed modularly so that they can be added to or switched off in the system as a whole.

In this case, it is ensured according to the invention that access and admission security is assured at all times.

The method will first be explained in detail below within the specific context of the home automation described above. This will be followed by a second generic illustration of the method abstracted from the specific context.

Hierarchy Levels within the Context of Home Automation

Figure 2:
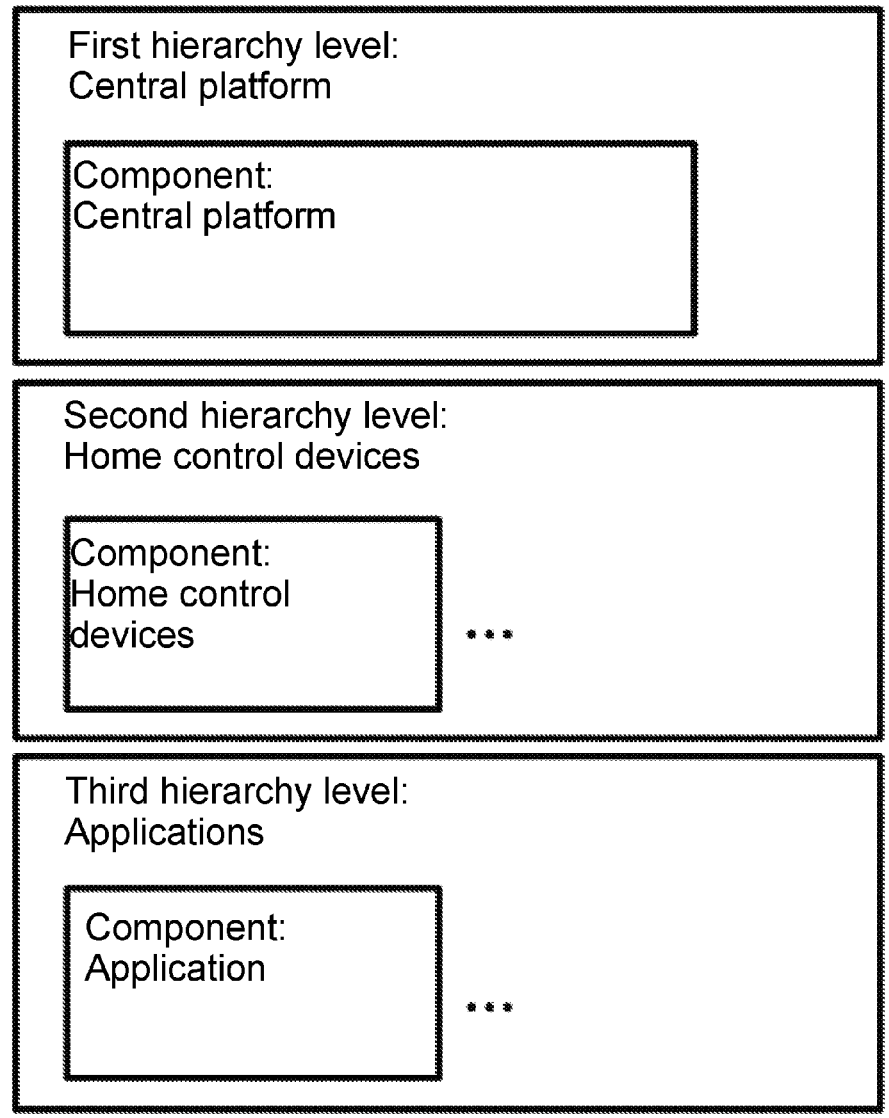
FIG. 2 shows the hierarchy levels in the context of home automation.

The allocation of the hierarchy levels is divided in respect of the home automation specifically described above as presented below. FIG. 2 illustrates the hierarchy levels within the context of home automation.

First hierarchy level: Central platform
Second hierarchy level: Home control device
Third hierarchy level: Applications
First Hierarchy Level: Central Platform The method is defined as follows for the first hierarchy level, the central platform, in respect of the home automation specifically described above.

Registration of the User
Initial registration of the user
Initial registration of the user takes place by storing the identity (e.g. the user name) and the credentials (e.g. user name and password) on the central platform.
Self-Registration of the Home Control Device
Self-registration of the home control device
The home control device is connected to power and the Internet. It logs onto the central platform independently with its own identity (e.g. the device number). The device logs on as not yet assigned to any user.
Possession of a Home Control Device
Identification of the home control device
The authenticated (see below) user identifies the home control device to be taken possession of by entering the identity of the device (e.g. the device number).
Verification of the ownership status
The user specifies a credential (e.g. user name and password), a random number (if necessary, the customer has been notified of the random number in the previous step, or similar) on a suitable interface of the home control device (e.g. a local web server). The home control device sends this credential to the central platform. With this step the central platform ensures that the home control device is (at this moment) in the possession of this user (the user just had direct manual access to the home control device, or indirect access from one and the same LAN in which, for example, the browser of the user and the home control device are located).
Storing of credentials on the home control device
The identity of the user (e.g. the user name) and his credentials (e.g. user name and password, user name and a hash value of the password or other appropriate credentials) are stored in the home control device.
Online Use
Authentication
Authentication takes place on the central platform with the identity (e.g. user name) and the credentials (e.g. user name and password) of the user.
Authorisation and use
Authorisation of the user to use the functions of the central platform takes place in the platform. The rights model of the platform is used as the basis during authorisation.
Forwarding
The central platform forwards requests/queries e.g. from an Internet-enabled computer to the components of the second hierarchy level, the home control devices. Requests are only forwarded to the home control devices to which the user has rights of use.
Second Hierarchy Level: Home Control Devices The method is defined as follows for the second hierarchy level, the home control devices, in respect of the home automation specifically described above.

Online Authentication
(Online) authentication
Authentication of the identity of the user takes place on the central platform. The authenticity established there is applied by the home control devices.
Offline Authentication
Offline authentication
If the home control device is offline, authentication of the identity of the user takes place locally on the home control device by means of the identity of the user stored on the device as well as his stored credentials. A home control device is in the offline state when it is not connected to the central platform. Local means that the home control device is not controlled via the Internet. Rather a computer, for example, is linked via the home network, for example, to the home control device for the purpose of controlling.
(Online and Offline) Use
Authorisation and use
Authorisation of the user to use the functions of the home control device takes place in the home control device. The rights model of the home control device is used as the basis during authorisation.
Forwarding
The home control device authorises the forwarding of requests to components of the third hierarchy level, the applications. Specifically, requests are only forwarded to the applications to which the user has rights of use.
Third Hierarchy Level: Applications The method is defined as follows for the third hierarchy level, the applications, in respect of the home automation specifically described above.

Online Authentication
(Online) authentication
Authentication of the identity of the user takes place on the central platform or on the home control device and is imported by the applications.
Offline Authentication
Offline authentication
Although direct authentication on the application is conceivable using the method described here, it is not necessary for the home automation specifically described here: An application cannot be in the offline state.

(Online and Offline) Use
Authorisation and use
Authorisation of the user to use the functions of the application takes place in the application. The rights model of the application is used as the basis during authorisation.
Forwarding
Forwarding of requests is not necessary as there is no fourth hierarchy level.

Hierarchy Levels Detached from the Context of Home Automation

Figure 3:
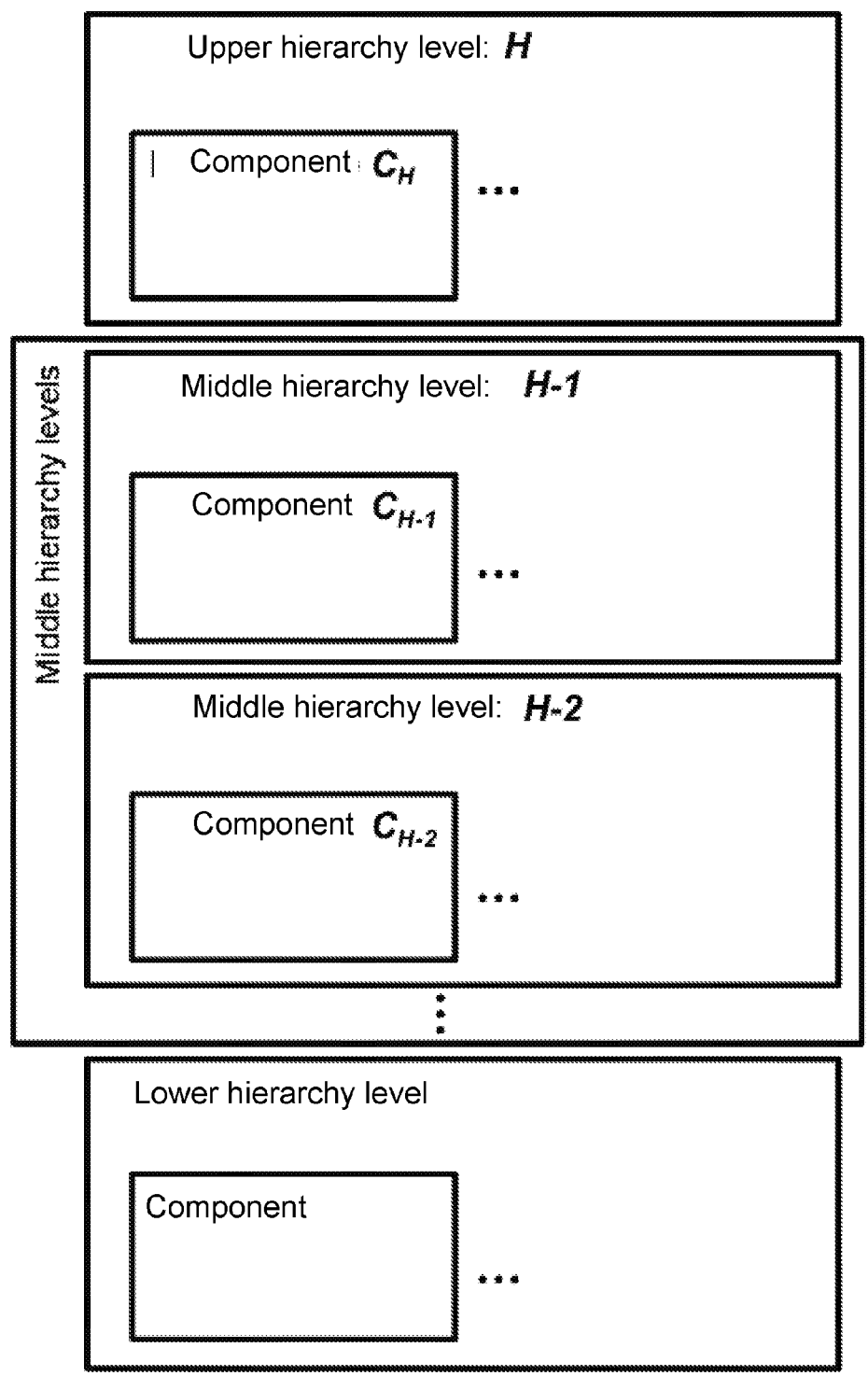
FIG. 3 shows the hierarchy levels detached from the context of home automation.

The allocation of the hierarchy levels is divided in respect of detachment from the home automation specifically described above as presented below. FIG. 3 illustrates the hierarchy levels within the context of home automation.
Higher hierarchy level H
Middle hierarchy levels e.g. H-1, H-2, etc.
Lower hierarchy level The highest hierarchy level H must be in place. The middle hierarchy levels can be present as often as desired. The lowest hierarchy level is in place or coincides in a trivial way with the highest hierarchy level.
Higher Hierarchy Level
For the highest hierarchy level H, the method, detached from reference to the home automation specifically described above, is defined as follows.
Registration of the User
Initial registration of the user
Registration of the user takes place on storing of the identity and the credentials on a component of the hierarchy level H, e.g. the component $C_H$.
Self-Registration of a Component
Self-registration of a component
A component (e.g. $C_{H-1}$, $C_{H-2}$, etc.) registers itself independently with its identity on a component of a higher hierarchy level, e.g. on the component $C_H$ of the hierarchy level H. The component announces itself as not yet assigned to any user.
Possession of a Home Control Device
Identification of the component
The user identifies the component (e.g. $C_{H-1}$, $C_{H-2}$, etc.) to be taken into possession by entering the identity of the component.
Verification of the ownership status
The user specifies an appropriate credential on a suitable interface of the component (e.g. $C_{H-1}$, $C_{H-2}$, etc.). The component sends this credential to the component $C_H$ of the hierarchy level H. The component $C_H$ authenticates the credential and therefore the ownership status.
Storing of credentials in the component
The identity of the user and his credentials are stored in the component (e.g. $C_{H-1}$, $C_{H-2}$, etc.).
Online Authentication
Authentication
Authentication of the identity of the user takes place on a component $C_H$ of the hierarchy level H with the relevant credentials C of the user.
(Online) Use
Authorisation and use
Authorisation for using the functions of the component $C_H$.
Forwarding
Authorisation of the forwarding of requests to component $C_{H-1}$ on the next hierarchy level H-1.

Middle Hierarchy Levels
For a middle hierarchy level, e.g. the hierarchy level H-1, the method, detached from reference to the home automation specifically described above, is defined as follows.
Online Authentication
(Online) authentication
Authentication of the identity of the user takes place by means of a component e.g. $C_H$ of an upstream hierarchy level e.g. H. The authenticity established there is imported by the component of the middle hierarchy level considered e.g. of the component $C_{H-1}$ of level H-1.
Offline Authentication
Offline authentication
If, for example the component $C_{H-1}$ of level H-1 is offline, then authentication of the identity of the user takes place locally on this component $C_{H-1}$ and by means of the identity of the user stored on the component as well as his stored credentials. Offline means that this component (e.g. component $C_{H-1}$) is not connected to another component (e.g. $C_H$) of a higher hierarchy level (e.g. H). Offline authentication is only part of the method if the component can be in the offline state.
(Online and Offline) Use
Authorisation and use
Authorisation for using the functions of the component $C_{H-1}$.
In this case, various components of this hierarchy level can authorise their (respective) functions differently.
Forwarding
Authorisation of the forwarding of requests to components $C_{H2}$ on the next (but one) hierarchy level H-2.
Lower Hierarchy Level
For the lowest hierarchy level, the method, detached from reference to the home automation specifically described above, is defined exactly as for a middle hierarchy level.
In a trivial way, the lowest hierarchy level cannot offer any forwarding.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling access for a home control device, the method comprising:

providing, by the home control device, a user with access to functions of the home control device in accordance with an online mode of the home control device when the home control device is connected to a central platform via the Internet, wherein providing the user with access to functions of the home control device in accordance with the online mode of the home control device is based on the access being granted by the central platform; and providing, by a home control device, the user with access to functions of the home control device in accordance with an offline mode of the home control device when the home control device is not connected to the central platform, wherein providing the user with access to functions of the home control device in accordance with the offline mode of the home control device is based on the access being granted locally by the home control device;

wherein fewer rights are provided to the user as part of access in accordance with the offline mode relative to the rights provided to the user as part of access accordance with in the online mode.

2. The method according to claim 1, wherein the functions of the home control device available to the user in the online mode of the home control device include downloading applications for the home control device from an application shop.

3. The method according to claim 1, wherein settings of the home control device are backed up to enable recovery for the home control device.

4. The method according to claim 1, wherein the central platform manages a plurality of home control devices.

5. A system, comprising:

a central platform, configured to be accessible via the Internet; and a home control device, configured to be connected to the central platform via the Internet and to be connected to household appliance;

wherein the central platform and the home control device are configured to provide a user with access to functions of the home control device in accordance with an online mode of the home control device when the home control device is connected to a central platform via the Internet, wherein providing the user with access to functions of the home control device in accordance with the online mode of the home control device is based on the access being granted by the central platform;

wherein the home control device is configured to provide the user with access to functions of the home control device in accordance with an offline mode of the home control device when the home control device is not connected to the central platform, wherein providing the user with access to functions of the home control device in accordance with the offline mode of the home control device is based on the access being granted locally by the home control device;

wherein fewer rights are provided to the user as part of access in accordance with the offline mode relative to the rights provided to the user as part of access accordance with in the online mode.

6. The system according to claim 5, wherein the central platform is configured to provide access to an application shop in order to download applications for the home control device.

7. The system according to claim 5, wherein the central platform is configured to back up settings of the home control device to enable recovery for the home control device.

8. The system according to claim 5, wherein the central platform is configured to manage a plurality of home control devices.

* * * * *